United States Patent
Rawson

4,035,068
July 12, 1977

[54] SPECKLE MINIMIZATION IN PROJECTION DISPLAYS BY REDUCING SPATIAL COHERENCE OF THE IMAGE LIGHT

[75] Inventor: Eric G. Rawson, Saratoga, Calif.

[73] Assignee: Xerox Corporation, Stamford, Conn.

[21] Appl. No.: 590,250

[22] Filed: June 25, 1975

[51] Int. Cl.² ............... G02B 23/00; G02B 13/20; G03B 21/00

[52] U.S. Cl. .................................. 353/122; 350/9; 350/188

[58] Field of Search ........... 353/121, 122; 350/188, 350/9

[56] References Cited
U.S. PATENT DOCUMENTS

| | | | |
|---|---|---|---|
| 1,780,969 | 11/1930 | Brunner | 353/121 |
| 3,262,359 | 7/1966 | Carpenter | 350/188 |
| 3,850,515 | 11/1974 | Burch | 353/122 |
| 3,904,289 | 9/1975 | Yager | 353/122 |
| 3,941,456 | 3/1976 | Schlitz et al. | 353/122 |

*Primary Examiner*—Steven L. Stephan
*Attorney, Agent, or Firm*—M. J. Colitz, Jr.; T. J. Anderson; L. Zalman

[57] ABSTRACT

An optical system for minimizing the speckle observed in a projected image, the image being produced by a projection display device. Coherent or non-coherent light illuminates the projection display device image and an image thereof is formed at an intermediate image plane. A narrow angle diffuser is positioned at the intermediate image plane and produces an enlarged illuminating aperture at the Fourier transform plane. The relatively large angle subtended by the illuminating aperture at a second image plane reduces the spatial coherence of the image formed thereat.

3 Claims, 3 Drawing Figures

SPECKLE MINIMIZATION IN PROJECTION DISPLAYS BY REDUCING SPATIAL COHERENCE OF THE IMAGE LIGHT

BACKGROUND OF THE INVENTION

Images which have been formed on a viewing screen (of either the front-projection or rear-projection type) by projection from projection display devices, such as the one disclosed in U.S. Pat. No. 3,853,614, may suffer from small scale scintillations, or speckle, which appear to move only when the viewer of the image moves his head. This effect is more objectionable in rear-projection screens upon which the image formed on the aforementioned display is projected because the light passing through a typical rear-projection screen retains more of its partial coherence than does the same light when reflected from a typical front-projection screen. Front projection displays are often used for this reason notwithstanding the more complex, less unified system arrangement which is required. The compact system geometries possible with rear-projection systems makes it highly advantageous to find solutions to the speckle problem associated with its use.

SUMMARY OF THE PRESENT INVENTION

The present invention provides an optical system for reducing the speckle observed in a projected image, the image being produced by a projection display device. Incoherent light illuminates the projection display device image and an image thereof is formed at a first image plane. A narrow angle diffuser is positioned at the first image plane and produces an enlarged illuminating aperture at the Fourier transform plane. The relatively large angle subtended by the illuminating aperture at a second image plane, reduces the spatial coherence of the image formed thereat.

It is an object of the present invention to provide method and apparatus for minimizing speckle observed in viewing an image projected onto a screen, the image being formed on a projection display device.

It is a further object of the present invention to provide method and apparatus for minimizing speckle observed in an image projected on a rear or front screen, the image being formed on a projection display device.

It is still a further object of the present invention to provide method and apparatus for increasing the apparent size of the aperture illuminating a projection screen with image light thereby minimizing speckle observed in viewing the image.

It is an object of the present invention to provide method and apparatus for increasing the apparent size of the aperture illuminating a projection screen with image light from an image formed on a projection display device, by utilizing a narrow angle diffuser positioned at an intermediate image plane, thereby minimizing speckle observed in viewing the image.

DESCRIPTION OF THE DRAWINGS

For a better understanding of the invention as well as other objects and further features thereof, reference is made to the following description which is to be read in conjunction with the accompanying drawings wherein.

DESCRIPTION OF THE PREFERRED EMBODIMENT

Figure 1:
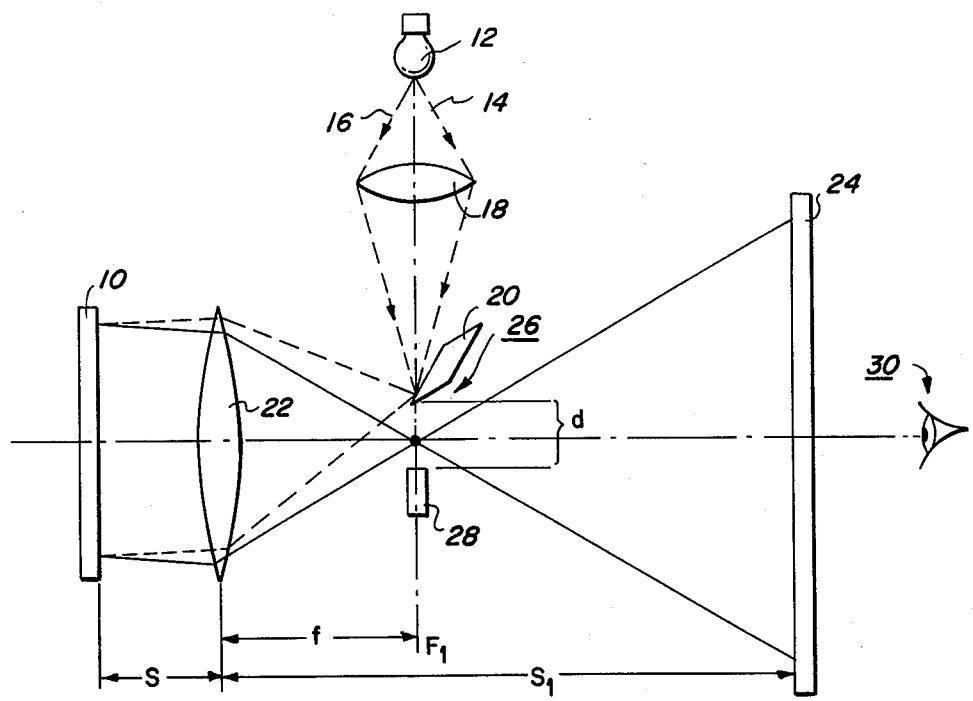
FIG. 1 illustrates a system for illuminating a rear projection screen.

An image buffer and display system, for storing and displaying an optical image is shown in FIG. 1. In particular, an image buffer 10, such as that disclosed in U.S. Pat. No. 3,853,614, is utilized to store optical information. The teachings of U.S. Pat. No. 3,853,614, which are necessary for purposes of this disclosure, are incorporated herein by reference. The optical information is recorded on the image buffer in the manner described in the aforementioned patent. The image stored on the surface of image buffer 10 is readout by illuminating the surface thereof with relatively bright illumination generated by source 12, such as that produced by a source of incoherent light, typically a polychromatic tungsten light source, or coherent light produced by a laser. The light rays 14 and 16 generated by source 12 are directed to lens 18 and focused thereby into a front-surface mirror 20. The light rays reflected from mirror 20 are directed to image buffer 10 via lens 22. The image bearing surface of image buffer 10 scatters light from the frosted area of the image which scattered light enters lens 22 and is projected onto screen 24 via illuminating aperture 26 of diameter $d$ (typically 4 mm in diameter) formed between diagonal mirror 20 and stop member 28. Image buffer 10 is separated from lens 22 by distance $s$, the distance being selected such that rear projection screen 24 is at the conjugate image plane of image buffer 10. The aperture 26 passes the zeroth-order light from the unfrosted areas on image buffer 10 while blocking all higher order reflections from the frosted areas. The aperture 26 is positioned at the Fourier transform plane $F_1$, which is spaced from lens 22 a distance $f$ equal to the rear focal length of lens 22. The light passed by aperture 26 is projected onto rear screen 24, an observer 30 viewing the image projected thereon. The partial spatial coherence of the illuminating light transmitted by aperture 26 causes the speckle in the image when viewed by the observer 30. For example, if the distance $S_1$ from transform plane $F_1$ to rear projection screen 24 is 0.9 meters, for a 4 millimeter aperture the source (assuming the aperture 26 as the illumination light source) subtends a $f/225$ cone at the projection screen 24.

As set forth hereinabove, although the system shown in FIG. 1 can readout the image formed on image buffer 10, the image formed on rear projection screen 24 as viewed by observer 30 has an usually high degree of speckle due primarily to the small size of the illuminating aperture 26. It should be noted that the embodiment shown in FIG. 1 (and FIG. 2 described hereinafter) is a zeroth order display system whereby the zeroth order reflection is laterally offset in the Fourier transform plane $F_1$ from the image of the source 12 formed by condenser lens 18 by means of a small tilt of image buffer 10.

Figure 2:
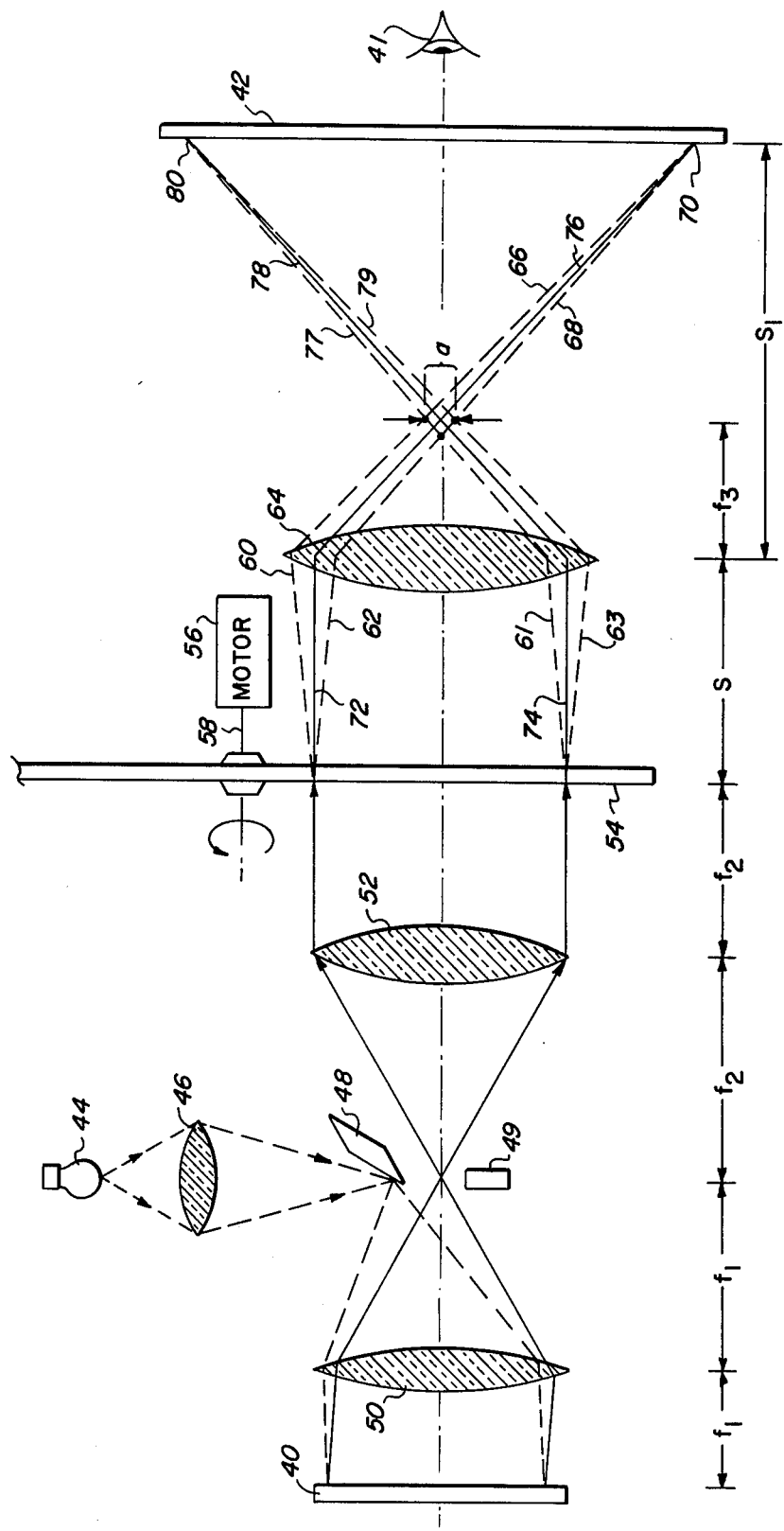
FIG. 2 is apparatus incorporating the teachings of the present invention.

The present invention improves upon the system shown in FIG. 1 by increasing the apparent size of the illuminating aperture by using a unique diffusing screen fabricated to have a suitably narrow scattering distribution and low scattering at large angles, particularly in the backward direction. The diffusing screen and a technique for its fabrication is described hereinafter with reference to FIG. 3. FIG. 2 shows the optical system in which the diffusing screen is utilized.

Referring now to FIG. 2, image buffer 40, such as that disclosed in aforementioned U.S. Pat. No. 3,853,614, has an image formed thereon which is to be viewed by an observer 41. In particular, it is desired to project the image formed on image buffer 40 onto rear projection screen 42. It should be noted that the invention could be adapted to reduce speckle in a front projection screen by utilizing screen 42 as a front projection screen and positioning observer 41 on the side of screen 42 opposite to that shown in the figure. In order to readout the image, image buffer 40 is illuminated by light produced by a source of illumination 44 which, in the preferred mode, is incoherent light. The light emitted therefrom is condensed by lens 46 onto tilted mirror 48 which directs the rays onto image buffer 40 via lens 50, lens 50 being spaced from image buffer 40 by a distance $f_1$ equal to its front focal length. The light rays reflected from image buffer 40 are focused via lens 50 at the Fourier transform plane $F_1$ via the aperture formed between mirror 48 and stop 49 to thereafter form an image at diffusing screen 54, described in more detail hereinafter with reference to FIG. 3, having passed through and been collimated by lens 52. Fourier transform plane $F_1$ is spaced from lens 50 a distance $f_1$ equal to its rear focal length.

Although in the preferred mode of operation the screen is stationary, it may be rotated about its axis at a predetermined angular frequency by motor 56 via shaft 58. The image which is projected through screen 54 is diffuse, the diffuse light rays indicated by reference numerals 60, 62 and 61, 63 being incident upon projection lens 64 as shown. The emerging light rays 66 and 68, corresponding to rays 60 and 62, respectively and rays 77 and 79, corresponding to rays 61 and 63, respectively, are imaged at points 70 and 80 on screen 42, as shown. With diffusing screen 54 in the system light rays 72 and 74 (and the rays lying at angles between rays 60, 62 and 61, 63) exit from lens 52. Without diffusing screen 54, all rays lie very close to the single rays 72 and 74 as shown. In this sense, rays 72 and 74 are representative rays. In this latter case, incident light rays 72 and 74 are focused by lens 64, emerging rays 76 and 78 (corresponding to rays 72 and 74, respectively) being projected onto projection screen 42 at points 70 and 80 as shown. If the diffuser was not present, the light rays 72 and 74 would be focused at a distance $f_3$ from lens 64, forming an image thereat of the light source 44, and then pass on to be imaged on screen 42 as shown. With the diffusing screen 54 in place, the light rays 66 and 68 (and 77 and 79) define an increased apparent size of the illuminating aperture $a$ at Fourier transfer plane $F_2$; that is, there is an increase in the width of the light intensity distribution at plane $F_2$.

The optical system shown in FIG. 2 is similar to that shown in FIG. 1 through Fourier transform plane $F_1$, except that the image buffer 40 is positioned at a distance from lens 50 equal to the front focal length thereof. A second lens 52 is positioned to provide a first image of the stored image on image buffer 40 at its back focal plane, a distance equal to the focal length $f_2$ of the lens 52, i.e. the image appears at the plane of diffusing screen 54. Lens 64 projects the diffuse image from diffusing screen 54 onto the rear projection screen 42. The diffusing screen 54 has a very narrow angular scattering distribution, described hereinafter in more detail, with a typical full angle at half intensity being approximately 4° to 8°. Lens 64 has an entrance pupil large enough to accept a substantial fraction of the scattered rays from each point on the image to project the diffuse image on screen 42.

When the diffusing screen 54 is removed, the illuminating aperture (i.e. the beam diameter or area occupied by the light distribution at that point) at plane $F_2$ is the same size as that at plane $F_1$ (typically 4 mm), assuming $f_2$ equals $f_3$, and the beam coherence is therefore as high as that produced by the system shown in FIG. 1. With a diffusing screen in place, however, the illuminating aperture $a$ at plane $F_2$ (defined by the broken line rays) is much larger, typically 40 millimeters. This increase by a factor of approximately 10 times the illuminating aperture corresponds to a $f$/number reduction from approximately $f$/225 to approximately $f$/22 and hence a correspondingly large reduction in the magnitude of speckle in the image light scattered from screen 42 to observer 41. As the $f$/number of the light beam decreases (i.e., as the beam becomes wider), the spatial coherence of the beam decreases.

Figure 3:
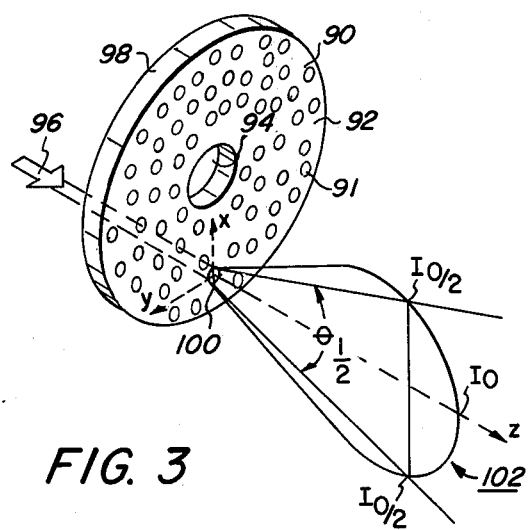
FIG. 3 illustrates a narrow angle diffusing screen which may be utilized in the practice of the preferred embodiment of the present invention.

Referring now to FIG. 3, a typical diffusing screen arrangement which may be utilized in the present invention is illustrated. A glass disc 90, corresponding to diffuser 54 shown in FIG. 2, ground and etched on side 92 in a manner as set forth hereinafter, has a center hole 94 for mounting disc 90 on motor shaft 58 (FIG. 2). A narrow light beam 96 from lens 52 is incident normal to the surface 98 of disc 90. A set of rectangular coordinate axis with origin at point 100 where beam 96 is incident onto surface 92 is shown, the $z$ axis being perpendicular to surface 92 of disc 90. A polar plot 102 of the far-field distribution of the scattered light intensity is illustrated, the intensity scattered in the forward direction being a maximum ($I_o$) on the $z$ axis. The angles where the intensity falls to $I_o/2$ define the scattering "half-angle," $\theta_{1/2}$ which is typically in the range from 4° to 8°. It should be noted that there is little or no scattering at large angles or in the backward direction. The angular width of the diffusing screen scattering distribution should be chosen to be as large as possible consistent with retaining most of the scattered light within the entrance pupil of lens 64. As set forth hereinabove, the typical width is approximately 4° to 8°. The smaller value generally provides good speckle reduction with negligible light loss while the higher value provides better speckle reduction with moderate light loss.

A suitable diffusing screen with the desired angular width is provided in the following manner. One surface of a glass plate (disc) is ground with a fine grit (typically No. 600 grade grit) and then etched with a diluted solution of hydrofluoric acid (typically 10% hydrofluoric acid and 90% water) for a length of time found empirically to give the desired angular width. In general, the longer the etching time, the narrower the distribution becomes. A typical etch time is about 15 minutes (for angular width equal to 8°) to one hour (for angular width of 4°) but this depends on the type of glass utilized and the nature of the initial ground surface. It is to be noted that "No. 600 grit" is a generic term describing a fine grit, typically the finest of a series used in sequence (from coarse to finer to very fine) when preparing conventional polished glass surfaces and is typically the final grinding compound used before polishing. In the etching process referred to hereinabove, the glass is placed in the dilute acid, the glass is agitated relative to the acid to maintain fresh acid at the surface and the glass is removed from the acid at the appropriate time. The other flat glass face could be protected during the acid etch by temporarily coating it with plastic or a photoresist layer which is removed after the etching process. The resulting diffuser is a surface with small, concave, nearly spherical scallops 91 randomly located over its surface and has the desired angular scattering distribution. In the case where the average size of the scallops may be larger than the required image (picture) element size, the diffusing screen can be rotated so as to render such scallops not noticeable by virtue of their motion and persistance of vision effects in the observer by energizing motor 56. In the situation where rotation is desired, diffusing screen 54 is shaped as a disc. In the non-rotating situation, diffusing screen 54 obviously may be shaped in alternate forms, such as a rectangularly shaped glass plate.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A system for minimizing the speckle observed in an image projected onto a screen by reducing the spatial coherence of the image light, the image being formed on the surface of an image bearing member comprising:
    an image bearing member having an image formed on a surface thereof and positioned in an image plane,
    means for illuminating said image surface with light,
    a first lens for focusing the light reflected from said image surface to form an image thereof at a first plane displaced from said image plane,
    a diffusing screen having a distribution angle between 4° and 8° and characterized by a surface having small, concave scallops randomly located thereover, said diffusing screen being positioned at said first plane whereby the light image incident thereon is diffused as it passes therethrough,
    a second lens for collecting the diffused light image and projecting the diffused image, said second lens forming an enlarged illuminating aperture at a distance spaced therefrom, and
    a projection screen spaced from said illuminating aperture for receiving said projected image, said illuminating aperture subtending a relatively large angle at the projection screen whereby the spatial coherence of the image formed thereat is reduced.

2. The system as defined in claim 1 further including means for rotating said diffusing screen.

3. The system as defined in claim 1 further including a third lens interposed between said first lens and said diffusing screen for collimating the light image formed by said first lens.

* * * * *